Dec. 13, 1966  H. POOLE  3,290,887
SWIVELABLE NOZZLE FOR A JET ENGINE
Filed Feb. 15, 1965  2 Sheets-Sheet 1
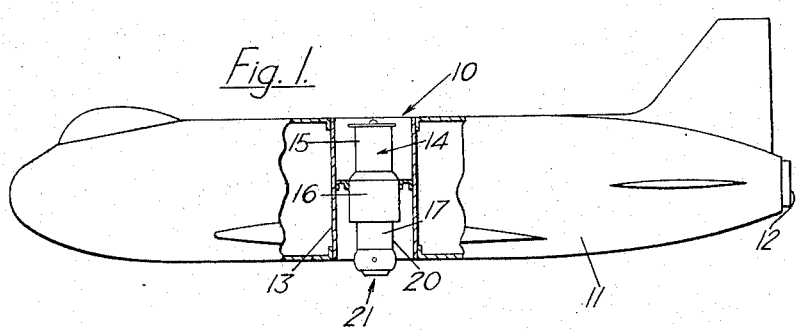
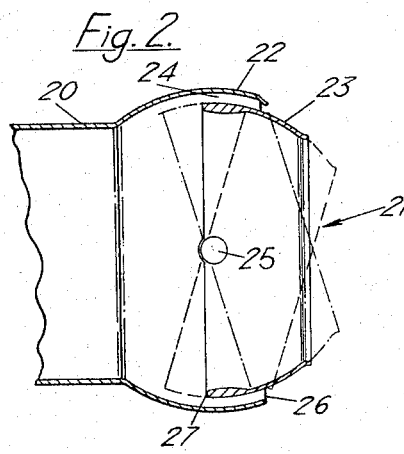
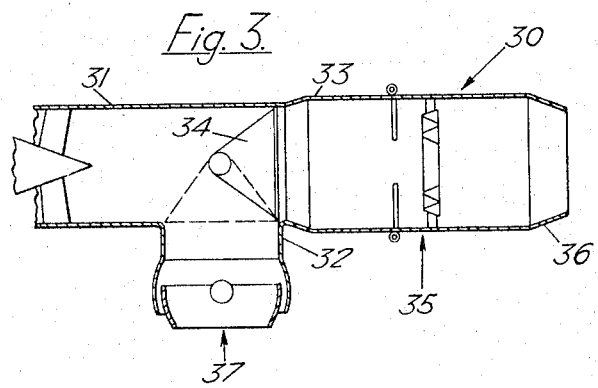
Inventor
Horace Poole
By
Cushman, Darby & Cushman
Attorneys Inventor
Horace Poole
By Cushman, Darby & Cushman
Attorneys United States Patent Office 3,290,887
Patented Dec. 13, 1966

3,290,887
SWIVELABLE NOZZLE FOR A JET ENGINE
Horace Poole, Bulwell, Nottingham, England, assignor to Rolls-Royce Limited, Derby, England, a company of Great Britain
Filed Feb. 15, 1965, Ser. No. 432,579
11 Claims. (Cl. 60—229)

This invention concerns a nozzle for a jet engine.

According to the present invention, there is provided a nozzle for a jet engine comprising a part-spherical outer member and a single part-spherical inner member which is mounted within the outer member and which may be swivelled therein to alter the direction in which the jet gases passing through the inner member leave the latter.

Hitherto, it has been usual for the swivelling member of a jet engine nozzle to be disposed externally of a fixed member of the nozzle. It has therefore been necessary to provide some sealing means between the swivelling member and the fixed member so as to prevent gas leakage. In the case of the present invention, however, the swivelling member is an inner member which is mounted within the outer member of the nozzle, and it is therefore unnecessary to provide sealing means between the two members since any gases which pass between them will flow generally in the direction of flow of the jet gases passing through the inner member.

There may be annular gap between the outer and inner members, part of the jet gases supplied to said nozzle passing through said annular gap. In this case, the outer member preferably has a converging outlet portion.

The invention also comprises a jet engine provided with at least one nozzle as set forth above.

Thus, the engine may also have a main nozzle, valve means being provided for allowing the jet gases to flow through either the main nozzle or the first-mentioned nozzle. The engine may have reheat combustion equipment which is provided upstream of the main nozzle but downstream of said valve means.

The invention also comprises an aircraft provided with horizontally mounted forward propulsion engine, the said engine being as set forth above.

Additionally, the invention comprises an aircraft provided with a vertically mounted vertical lift engine, the said engine being as set forth above.

The term "vertical lift engine" as used in this specification is to be understood to refer to an engine which is adapted to produce vertical lift forces on an aircraft independently of those generated aerodynamically by forward flight of the aircraft.

The invention is illustrated, merely by way of example, in the accompanying drawings, in which:

FIGURE 1 is a diagrammatic side elevation, partly in section, of an aircraft provided with a vertical lift engine, the said engine having a nozzle according to the present invention;

FIGURE 2 is a sectional view of a nozzle according to one embodiment of the invention;

FIGURE 3 is a diagrammatic sectional elevation of a horizontally mounted forward propulsion engine, the said engine having a nozzle according to the present invention;

Figure 4:
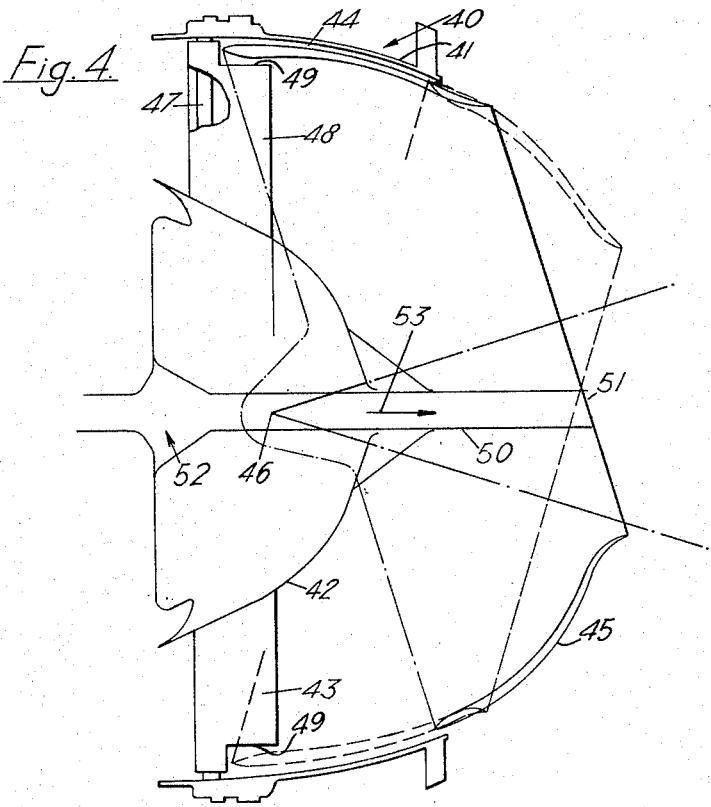
FIGURE 4 is a sectional view of a nozzle according to an alternative embodiment of the invention.

In FIGURE 1 there is shown an aircraft 10 having a fuselage 11 at the rear of which there is a horizontally mounted forward propulsion gas turbine jet engine 12.

The fuselage 11 is provided with an engine bay 13 in which are vertically mounted a plurality of vertical lift engines 14 (only one shown). Each vertical lift engine 14 comprises in flow series a compressor 15, combustion equipment 16, and a turbine 17. The turbine exhaust gases of each vertical lift engine 14 are directed to atmosphere through an exhaust duct 20 having a nozzle 21.

According to one embodiment of the invention (FIGURE 2), each nozzle 21 comprises a part spherical outer member 22 and a single part-spherical inner member 23, the latter being mounted within the outer member 22 and spaced therefrom by an annular gap 24. The inner member 23 is mounted on a pivot 25 and may be swivelled in the outer member 22 (by power means not shown) so as to alter the direction in which the jet gases passing through the inner member 23 leave the latter.

Part of the jet gases supplied to each nozzle 21 pass through the annular gap 24, the outer member 22 having a converging outlet portion 26 to enable a positive thrust to be obtained from the jet gases passing through the annular gap 24.

To reduce turbulence as a result of the presence of the inner member 23, the upstream end of the inner member 23 is provided with a leading edge 27 of aerofoil section.

As will readily be appreciated, the construction shown in FIGURE 2 does not incorporate a seal between the outer member 22 and inner member 23 of each nozzle 21 since any jet gases which pass between the members 22, 23 will flow generally in the same direction of flow as the jet gases passing through the inner member 23.

In FIGURE 3 there is shown a gas turbine jet engine 30 which is adapted to be mounted horizontally in an aircraft (not shown). The jet gases from the turbine (not shown) of the engine 30 are directed through an exhaust duct 31 which communicates both with a vertically downwardly extending duct 32 and with a jet pipe 33.

A pivotally mounted valve 34 is disposed in the exhaust duct 31 and is movable (by means not shown) between a position, shown in full lines, in which it permits flow from the exhaust duct 31 to the duct 32 only, and a position, shown in dotted lines, in which it permits flow from the exhaust duct 31 to the jet pipe 33 only.

Mounted in the jet pipe 33, and thus disposed downstream of the valve 34, is reheat combustion equipment 35, the jet pipe 33 being provided at its downstream end with a variable area main nozzle 36.

The duct 32 is provided with a nozzle 37 whose construction is the same as that of the nozzle 21.

It will be appreciated that nozzles such as the nozzles 21, 37 may be employed at the ends of spaced, downwardly directed pipes provided on an aircraft for stability control. Thus such pipes may be supplied with air compressed in the engine compressor, means being provided for varying the relative quantities of air supplied to the various pipes.

A nozzle according to an alternative embodiment of the invention is illustrated in section in FIGURE 4. According to this embodiment a nozzle 40 is formed between a part-spherical outer member 41 and a central bullet member 42. The central bullet member 42 is supported from the outer member 41 by means of a plurality (for example, twelve) of radial equiangularly spaced supports 43.

Mounted within the outer member 41, and spaced therefrom by an annular gap 44, is a part-spherical inner member 45 which is mounted for pivotal movement about an axis 46 extending perpendicularly to the plane of FIGURE 4. The inner member 45 may be swivelled about the axis 46 between the position shown in full lines in FIGURE 4 to the position shown in broken lines in FIGURE 4. Typically, an angle of about 30 degrees separates the two extreme positions of the inner member 45 as illustrated by the full and broken lines respectively.

Each support 43 has a central load bearing member 47 and a streamlined outer fairing 48. The fairings 48 of at least some of the supports 43 have recesses 49 therein to accommodate the upstream portion of the inner member 45 when the latter is in either of its external positions, referred to above.

A conduit 50 passes through the bullet member 42 on the axis thereof. The conduit 50 has an open downstream end 51 which is disposed in a region of low dynamic pressure when jet gases are passing through the nozzle 40. The upstream end of the conduit 50 communicates with a turbine shaft tail bearing assembly illustrated generally at 52. The passage of jet gases through the nozzle 40 causes air to flow through the conduit 50 in the direction of arrow 53 by means of a venturi effect, the air flow thus induced assisting in cooling the bearing assembly 52.

Figure 5:
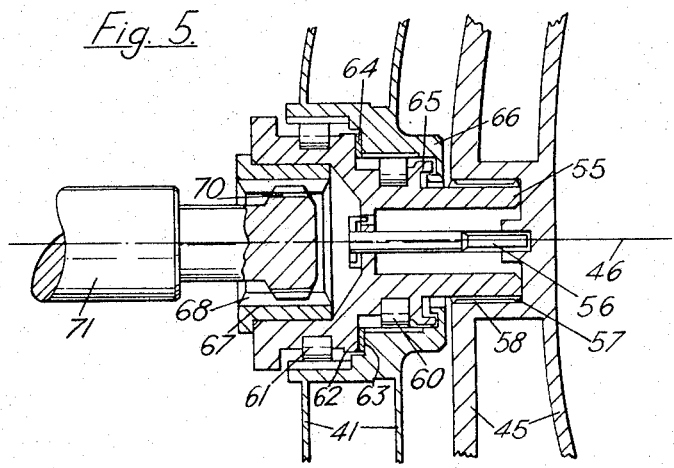
FIGURE 5 is an enlarged cross-section of part of the nozzle shown in FIGURE 4, taken on the pivotal axis of the nozzle.

The inner nozzle member 45 is supported for pivotal movement about the axis 46 in two diametrically opposed bearings supported in the outer member 41. One such bearing is illustrated in section in FIGURE 5. A similar bearing could, of course, be used to support the inner nozzle member 23 of the embodiment shown in FIGURE 2.

A trunnion 55 is secured to the inner member 45 by means of a bolt 56, the trunnion 55 and the inner member 45 carrying inter-engaging splines 57, 58, by means of which the trunnion 55 is locked angularly with respect to the inner member 45. The trunnion 55 is received in an aperture in the outer member 41 and is supported therein by co-axial inner and outer roller bearings 60, 61 for rotation about the axis 46. The outer roller bearing 61 has a larger diameter than the inner roller bearing 60.

The roller bearings 60, 61 are mounted between respective bearing surfaces formed on the trunnion 55 and the outer member 41. An axially facing shoulder 62 is provided on the trunnion 55 between the inner and outer bearings 60, 61 and a co-operating annular shoulder 63 is provided on the outer member 41. When the bearing is assembled an annular thrust pad 64 is sandwiched between the shoulders 62, 63. Further axial engagement between the trunnion 55 and the outer member 41 is provided by respective lipped flanges 65, 66 provided on the trunnion 55 and the outer member 41. When the bolt 56 is secured on assembly of the bearing the flange 65 is located within the flange 66. This inter-engagement of the flanges 65, 66 in addition to assisting in relative location of the trunnion 55 and the outer member 41, also provides in effect a labyrinth seal for protecting the bearings 60, 61 against the hot exhaust gases.

Outwardly of the bolt 56 the trunnion 55 is formed with a cylindrical cavity in which a cylindrical bush 67 is fitted. The bush 67 is provided on its internal surface with axially extending splines 68. The splines 68 are engaged by corresponding splines 70 on a drive spindle 71. Rotary drive is transmitted to the drive spindle 71 from power means (not shown) in order to rotate the inner member 45 relative to the outer members 41. The splined connection 68, 70 ensures the transmission of rotary drive from the spindle 71 while permitting some axial play between the spindle 71 and the nozzle members 41, 45.

I claim:

1. A nozzle for a jet engine comprising a part-spherical outer member, a single part-spherical inner member which is mounted within the outer member and which is swivelable with respect thereto to alter the direction in which the jet gases passing through the inner member leave the latter, a bullet member disposed centrally of the outer member and a plurality of radially extending supports securing said bullet member to the outer member, at least some of said supports having reduced axial dimensions at their radially outer ends to accommodate the inner member when the latter is in a jet-deflecting position.

2. A nozzle as claimed in claim 1 wherein the bullet member is provided with a conduit extending centrally therethrough and having an open end disposed downstream of the bullet member, whereby air may be drawn through said conduit by a venturi effect when gases flow through the nozzle.

3. A jet engine having at least one nozzle comprising a part-spherical outer member, a single part-spherical inner member which is mounted within the outer member and which is swivelable with respect thereto to alter the direction in which the jet gases passing through the inner member leave the latter, a bullet member disposed centrally of the outer member and a plurality of radially extending supports, securing said bullet member to the outer member, at least some of said supports having reduced axial dimensions at their radially outer ends to accommodate the inner member when the latter is in a jet-deflecting position.

4. A nozzle for a jet engine comprising: a part-spherical convergent outer member and a single part-spherical convergent inner member mounted within and spaced inwardly from said outer member to define an annular part-spherical convergent gas passage therebetween, said inner member being swivelable with respect to said outer member to alter direction in which jet gases passing through said inner member leave the latter, said gas passage between said outer member and said inner member insuring that jet gases supplied to said nozzle and passing therethrough contribute to thrust produced by the nozzle.

5. A nozzle as claimed in claim 4 in which two diametrically opposed trunnions are mounted on the inner member and respective bearing means are provided supporting said trunnions in the outer member, each said bearing means comprising two coaxial bearings and the outermost of said bearings being of larger diameter than the innermost thereof.

6. A nozzle as claimed in claim 4 and including a bullet member disposed centrally of the outer member and a plurality of radially extending supports securing said bullet member to the outer member, at least some of said supports having reduced axial dimensions at their radially outer ends to accommodate the inner member when the latter is in a jet deflecting position.

7. A nozzle as claimed in claim 6 wherein said bullet member is provided with a conduit extending centrally therethrough and having an open end disposed downstream thereof whereby air may be drawn through the conduit by a venturi effect when gases flow through the nozzle.

8. A jet engine comprising: a main nozzle; a further nozzle comprising a part-spherical convergent outer member, a single part-spherical convergent inner member swivelable with respect to the outer member to alter the direction of jet gases passing through the inner member when they leave the same, said inner member being mounted within and spaced inwardly from said outer member to define an annular part-spherical convergent gas passage therebetween, said gas passage between said outer member and said inner member insuring that jet gases supplied to the further nozzle and passing through said gas passage contribute to the thrust produced by the further nozzle when discharged from the gas passage; and valve means having respective positions in which jet gases flow respectively through said main nozzle and through said further nozzle.

9. A jet engine as claimed in claim 8 in which the engine has reheat combustion equipment which is provided upstream of the main nozzle but downstream of the said valve means.

10. An aircraft provided with a horizontally mounted forward propulsion engine, said engine having at least one nozzle comprising a part-spherical convergent outer member, a single part-spherical convergent inner member swivelable with respect to the outer member to alter the direction of jet gases passing through the inner member when they leave the same, said inner member being mounted within and spaced inwardly from said outer member to define said annular part-spherical convergent gas passage therebetween, said gas passage between said outer member and said inner member insuring that jet gases supplied to the nozzle and passing through said gas passage contribute to the thrust produced by the nozzle when discharged from the gas passage.

11. An aircraft provided with a vertically mounted vertical lift engine having a nozzle comprising a part-spherical convergent outer member, a single part-spherical convergent inner member swivelable with respect to the outer member to alter the direction of jet gases passing through the inner member when they leave the same, said inner member being mounted within and spaced inwardly from said outer member to define an annular part-spherical convergent gas passage therebetween, said gas passage between said outer member and said inner member insuring that jet gases supplied to the nozzle and passing through said gas passage contribute to the thrust produced by the nozzle when discharged from the gas passage.

References Cited by the Examiner

UNITED STATES PATENTS

| | | | |
|---|---|---|---|
| 1,076,701 | 10/1913 | Reid | 308—210 X |
| 2,475,786 | 7/1949 | Jordan. | |
| 2,699,647 | 1/1955 | Goebel | 239—265.35 X |
| 2,744,395 | 5/1956 | Massey et al. | 64—9 |
| 2,748,461 | 6/1956 | Ohlsson | 308—207 X |
| 3,041,830 | 7/1962 | Thomas et al. | 60—35.55 |
| 3,069,852 | 12/1962 | Stricker | 60—35.55 |
| 3,130,544 | 4/1964 | Penza | 239—265.19 |
| 3,155,342 | 11/1964 | Bolkow et al. | 60—35.54 X |

FOREIGN PATENTS 1,064,817   2/1958   Germany.

CARLTON R. CROYLE, *Primary Examiner.*